*J. W. Treadway,*

*Gang Plow.*

No. 108,214. Patented Oct. 11, 1870.

Witnesses:
M. Vorlander
Gustave Dietrich

Inventor:
J. W. Treadway
per Mmm
Attorneys.

UNITED STATES PATENT OFFICE.

JAMES W. TREADWAY, OF CROWN POINT CENTRE, NEW YORK, ASSIGNOR TO OLIVER A. WHITTEMORE, OF DENVER, COLORADO.

IMPROVEMENT IN GANG-PLOWS.

Specification forming part of Letters Patent No. 108,214, dated October 11, 1870.

*To all whom it may concern:*

Be it known that I, JAMES WILLSON TREADWAY, of Crown Point Centre, in the county of Essex and State of New York, have invented a new and useful Improvement in Gang-Plows; and I do hereby declare that the following is a full, clear, and exact description thereof, which will enable others skilled in the art to make and use the same, reference being had to the accompanying drawings, forming part of this specification.

Figure 1:
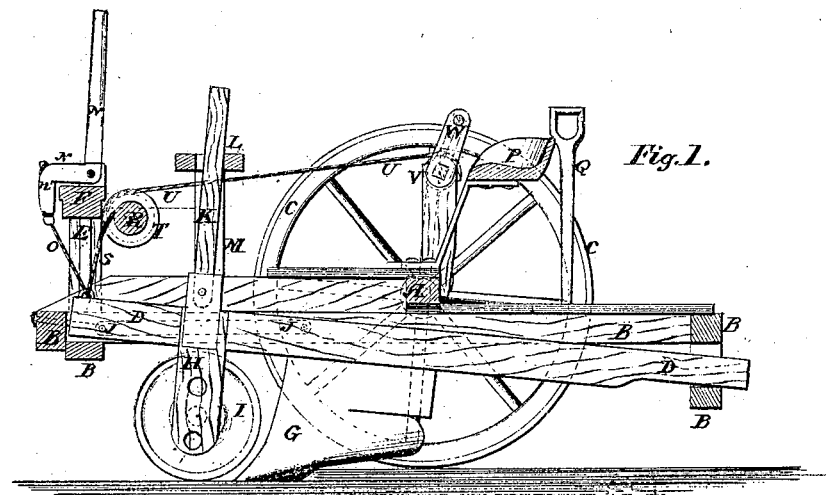
Figure 2:
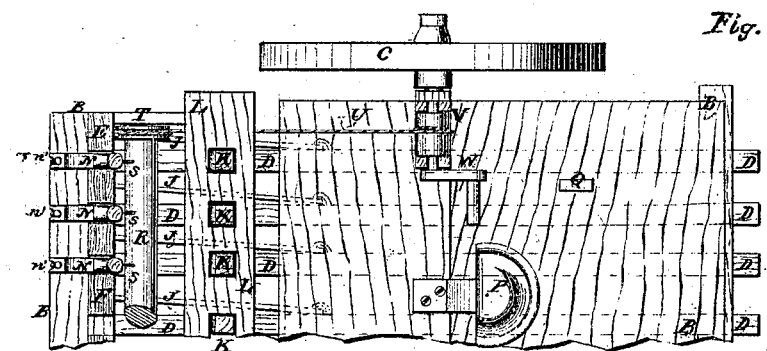
Figure 3:
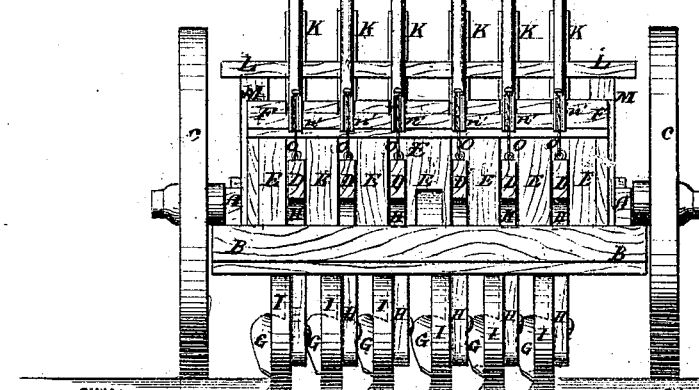

Figure 1 is a vertical longitudinal section of my improved plow. Fig. 2 is a top view of a portion of the same. Fig. 3 is a front view of the same.

Similar letters of reference indicate corresponding parts.

My invention has for its object to furnish an improved gang-plow, simple in construction and effective in operation, and which shall be so constructed that the plows will adjust themselves to the surface of the ground, so as to work at the same depth upon uneven and level ground, and so that the plows may be raised from the ground independently or all together, as may be required; and it consists in the construction and combination of the various parts of the machine, as hereinafter more fully described.

A is the axle-tree, to which the frame B of the machine is attached.

C are the wheels, the right-hand one of which I prefer to place upon a crank axle or horn, so that it may be adjusted to run upon the unplowed land in front of the plows or upon the furrow in the rear of the plows, as may be desired.

D is a set of parallel beams, the rear ends of which work in holes in the rear part of the frame B, as shown in Figs. 1 and 2. The forward ends of the beams D work between uprights or posts E, and are prevented from dropping down too far by a cross-bar of said frame passing beneath the said ends. The upper ends of the uprights E are connected and held in their proper relative positions by a cross-bar, F, to which said upper ends are attached.

G are the plows, which are made without landsides, and which are securely attached to the middle parts of the beams D.

To the beams D, in front of the plows G, are attached standards H, to the lower parts of which are adjustably pivoted the gage-wheels I, by which the depth at which the plows work in the ground is regulated. When plowing sod land or stiff soil, cutters may be attached to the sides of the gage-wheels I to cut through said sod or soil in front of the plows G. The draft-strain upon the beams D is sustained by the rigid bars or rods J, the rear ends of which are pivoted to the sides of the beams D, and the forward ends of which are pivoted to the forward part of the frame B or to the uprights E. The bars J also enable the plows to be backed out of the ground when required by "backing up" the machine.

K are guide or supporting bars or rods, which are pivoted to the upper side of the forward part of the beams D in such a way as to allow the said beams to have a free movement in the plane of their length, but no lateral movement. The upper ends of the bars K pass up through holes in the cross-bar L, the ends of which are screwed to the upper ends of the posts or standards M, the lower ends of which are secured to the side bars of the frame B. The bars K are designed to prevent the beams D from being inclined laterally by side pressure upon the plows, and thus guard against the possibility of the forward ends of the beams D being made to bind in the spaces between the uprights E by the said side pressure of said plows.

N are right-angled levers, which are pivoted at their angles to the cross-bar F, so that their short arms may rest upon a shoulder or rabbet of the said bar F, and their long arms may project vertically upward. The ends of the short arms of the levers N that project in front of the bar F are curved downward or have grooved cams or segments of pulleys n' formed upon them, as shown in the drawings.

To the levers N are attached the upper ends of the cords or chains O, which pass down along the grooves of the cams n', and the lower ends of which are attached to the forward part of the beams D. By this construction each of the plows may be raised from the ground independently of the others by operating the lever N, connected with that plow. This may be done by the driver from his seat P by means of the bar Q, which has a hole in one end, that may be passed over the upper end of either of the levers N. The bar or handle Q, when not in use, may be placed in a socket in the platform of the machine in such a position that it may be conveniently reached by the driver.

R is a shaft, the journals of which revolve in bearings in supports attached to the forward parts of the side bars of the frame B.

To the shaft R is attached one end of the short ropes or chains S, the other ends of which are attached to the forward parts of the beams D, so that by turning the said shaft to wind up the ropes or chains S the plows will all be raised from the ground at the same time.

To one end of the shaft R is attached a pulley or drum, T, to which is attached and around which is wound a rope or chain, U, the other end of which is attached to the short shaft or drum V, the journals of which work in bearings in supports attached to the frame-work of the machine in such a position that the driver from his seat P may reach the crank W, attached to the inner journal of said shaft or drum V, and operate it, and thus raise the plows from the ground all at the same time.

Having thus described my invention, I claim as new and desire to secure by Letters Patent—

1. The combination of the beams D, plows G, adjustable gage-wheels I, pivoted draft-bars J, uprights E, pivoted guard-bars K, and perforated bar L with each other and with the frame B, axle-tree A, and wheels C, substantially as herein shown and described, and for the purpose set forth.

2. The cam-levers N n', ropes or chains O and U and S, crank-drum V, drum T, and roller R, with the plow-beams D, all arranged substantially as shown and described, whereby said beams may be singly or collectively elevated.

JAMES WILLSON TREADWAY.

Witnesses:
GEORGE BROWN,
W. C. GUNNISON.